July 29, 1958   L. K. SPINK ET AL   2,845,121
BALANCE STARTER MECHANISM
Filed Aug. 26, 1955   3 Sheets-Sheet 1
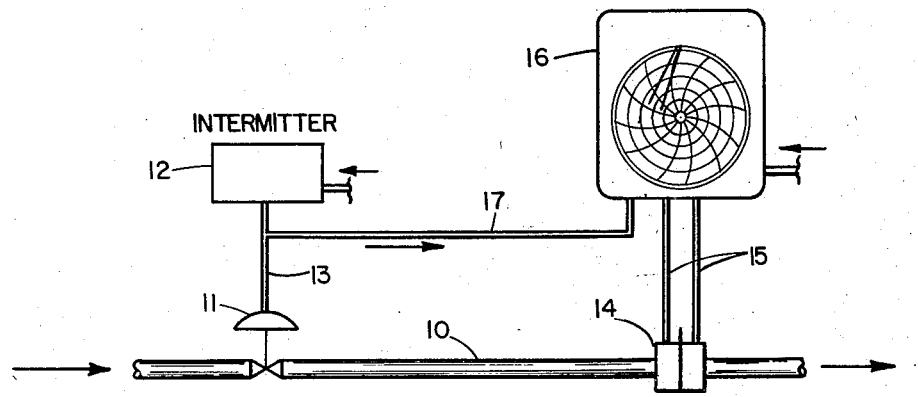
FIG. I
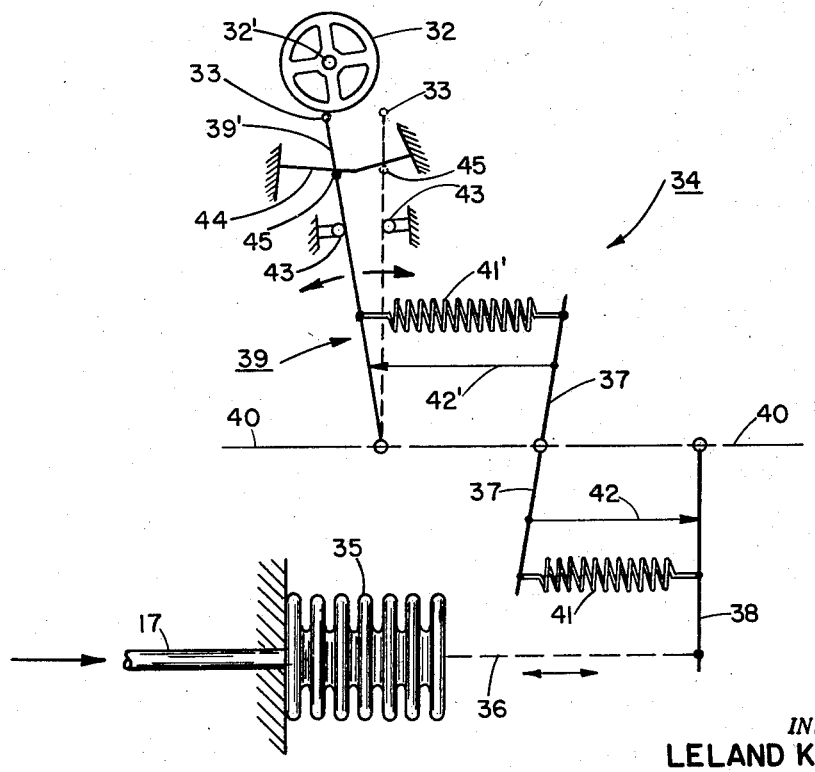
FIG. III
*INVENTOR.*
LELAND K. SPINK
BY CLAUDE D. YOUNG
Lawrence H. Poeton
AGENT

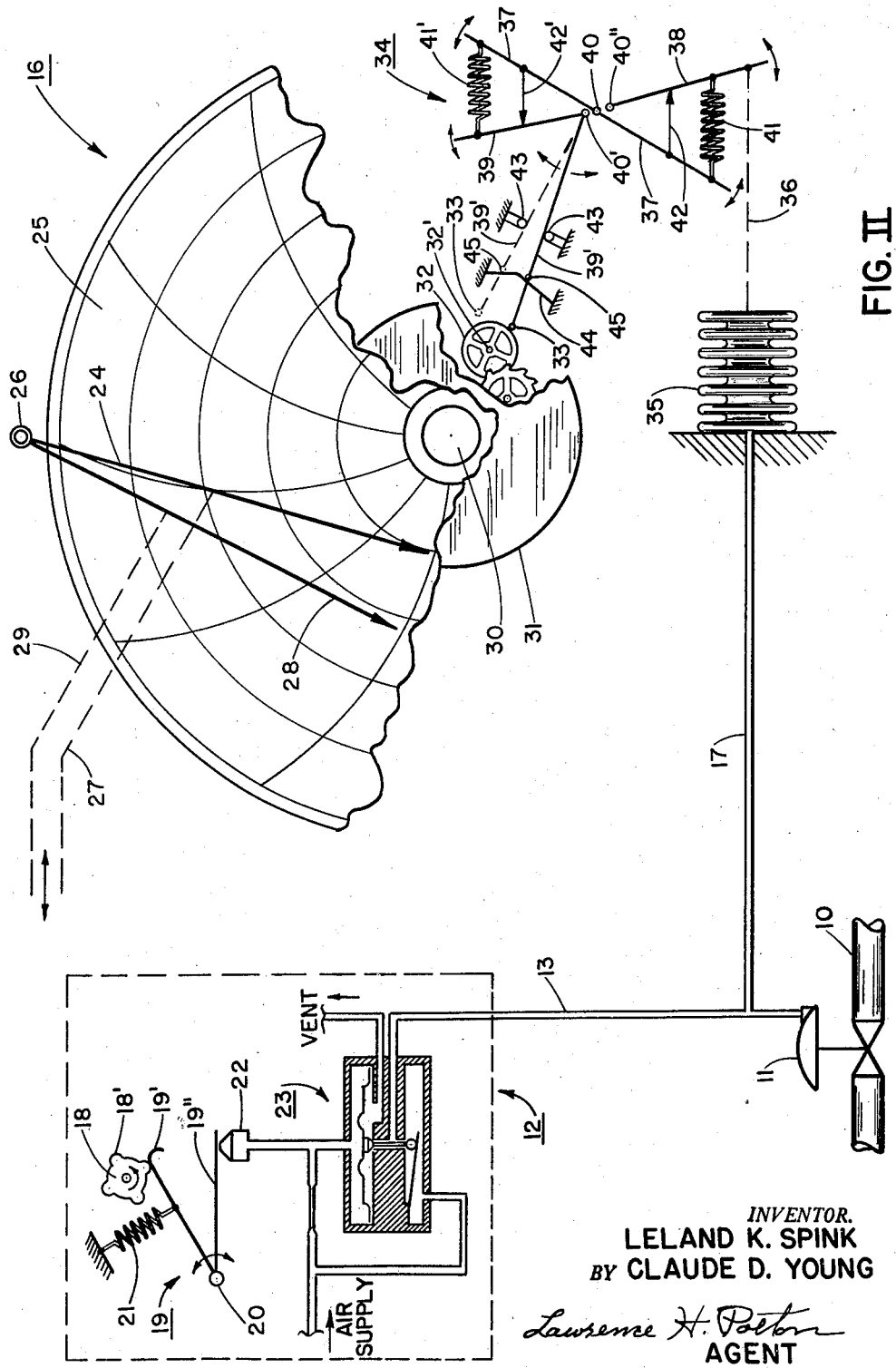
FIG. II
INVENTOR.
LELAND K. SPINK
BY CLAUDE D. YOUNG
Lawrence H. Patton
AGENT July 29, 1958   L. K. SPINK ET AL   2,845,121
BALANCE STARTER MECHANISM
Filed Aug. 26, 1955   3 Sheets-Sheet 3
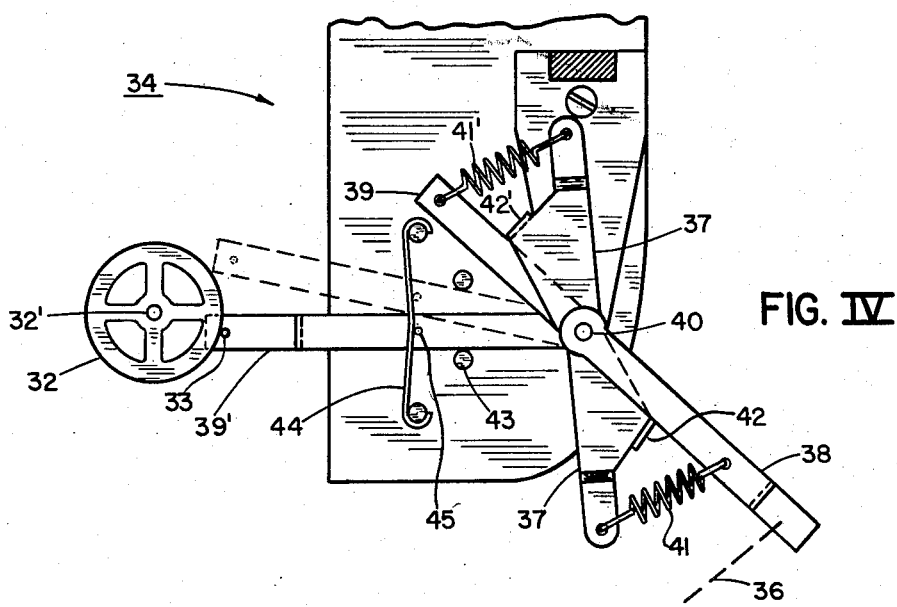
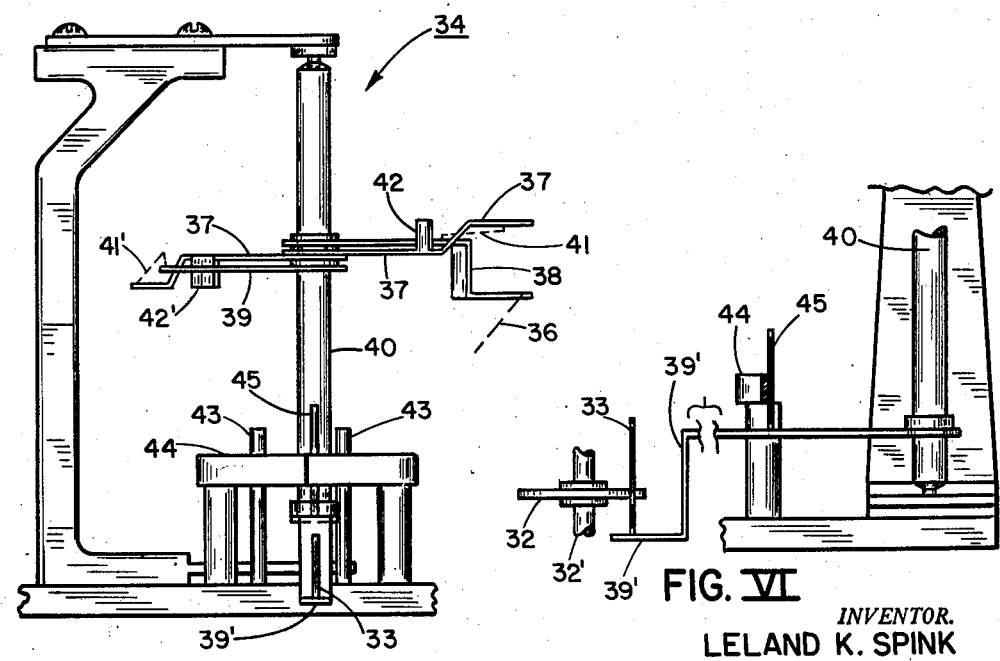
INVENTOR.
LELAND K. SPINK
BY CLAUDE D. YOUNG
AGENT

United States Patent Office 2,845,121
Patented July 29, 1958

2,845,121

BALANCE STARTER MECHANISM

Leland K. Spink and Claude D. Young, Foxboro, Mass., assignors to The Foxboro Company, Foxboro, Mass., a corporation of Massachusetts Application August 26, 1955, Serial No. 530,715

1 Claim. (Cl. 161—15)

This invention relates to means for measuring fluid flow in a fluid transmission pipe, and has particular reference to means for measuring intermittent flow.

The field of this invention includes industrial instruments such as recorders, controllers, and indicators.

As an illustrative embodiment of this invention, the discussion hereinafter relates specifically to oil well applications and the measurement of gas which is injected into oil wells as a means of lifting oil from the wells. When there is insufficient natural pressure to push the oil from a well, natural gas may be forced down into the well with the result that the oil is forced up and out of the well. In one such arrangement, oil flowing into the bottom of the well is forced up the well tubing by injecting gas down the casing. The gas is usually obtained from natural gas wells, or from natural mixtures of oil and gas. The natural flow of oil into the well in such cases is usually relatively slow, and the oil lifting gas is therefore injected into the well intermittently rather than continuously.

A device known as an "intermitter" is commonly used to inject the gas according to the need therefor. This need is preferably established as an optimum effective oil recovery rate which is determined empirically, and the gas injection is adjusted accordingly. An intermitter is a device for turning the gas flow on and off recurrently according to a predetermined time or signal plan and with respect to a minimum flow which is normally, but not necessarily, zero. It may be simply an on-off valve in a gas pipe line, operated by a time clock. Operating times and cycles vary widely, but many situations require the injection of gas for only a few minutes out of each hour.

It is desirable to measure and record the quantities of gas thus injected into oil wells, as a means of accounting for purchased gas; to avoid royalty payments on the injected gas when such gas is retrieved from the wells; and as a check in oil-gas ratios for conservation purposes. Accordingly, some form of gas measurement device is needed, and it is usually a recording instrument as well.

Continuous recording of intermittent gas injection is usually undesirable. When a slow moving circular record chart arrangement is used, such as the conventional seven day chart, the record is difficult, if not impossible, to read or compute because the active record is limited to very small increments of rotation on the chart. If a fast moving continuous rotation chart arrangement is used, the operator must be in close attendance to change the chart often, and much of the chart is not used for active records.

This invention provides a device which assures practical and effective measurement of gas flow as intermittently injected into oil wells. This is done by using a fast moving, intermittently operated circular chart, and in this invention specifically, by operating a flow measuring and recording instrument directly from the same intermitter that recurrently operates the valve in the gas pipe line, and by providing a novel operative connection from the intermitter to the measuring instrument.

It is therefore an object of this invention to provide a new and improved device for the measurement of intermittent fluid flow.

Other objects and advantages of this invention will be in part apparent and in part pointed out hereinafter, and in the accompanying drawings, wherein:

Figure I is an illustration of a gas flow measuring device embodying this invention;

Figure II is a showing of a substantial part of the system of the Figure I device, enlarged and in greater detail;

Figure III is a schematic showing of a mechanism portion of Figure II, enlarged, and somewhat altered to more clearly illustrate its operation;

Figure IV is a plan view of an actual structure of the mechanism of Figure III;

Figure V is an elevtaion of the mechanism of Figure IV; and

Figure VI is a showing of the lower portion of the mechanism as shown in Figure V, as viewed from the right in the drawing.

In Figure I, the general system of an illustrative embodiment of this invention comprises a gas flow pipe line 10, a pneumatically operable valve 11 in the pipe line 10, and an intermitter 12 with a pneumatic operative connection pipe 13 between the intermitter and the valve. Downstream of the valve 11, an orifice plate flow sensing unit 14 is mounted in the pipe line 10. Pneumatic pipe lines 15 connect the orifice plate unit 14 to a conventional rotary chart pneumatic recording instrument 16, and the intermitter 12 and the recorder 16 are pneumatically operatively connected by a pneumatic pipe line 17.

Figure II shows some detail of the Figure I intermitter 12 and of the recorder 16. The intermitter 12 comprises a rotatable cam member 18 with peripheral high spots 18′ formed at 90° angles thereabout. A V-shape pneumatic baffle 19 is pivotally mounted at 20, with one leg 19′ thereof biased against the periphery of the cam member 18 by a spring 21, and with the other leg 19″ arranged as a pneumatic baffle with respect to a pneumatic flow nozzle 22. Accordingly, as the cam 18 is rotated, the baffle 19 is recurrently pivoted to essentially open and close the nozzle 22, to intermittently provide a pneumatic signal in the form of back pressure from the nozzle 22.

The back pressure of the nozzle 22 is applied in the customary manner to a conventional pneumatic relay 23, with the output therefrom applied to the pneumatic connection pipe 13, leading directly to the valve 11, and to the recorder 16 by way of the pneumatic connection pipe 17.

Thus the intermitter 12 produces a series of pneumatic signals, each of which operates both the valve 11 and the recorder 16. The intermitter cam 18 may be rotated by any suitable mechanism (not shown), either steadily or according to a predetermined plan of varied rotation, or according to actuation by a suitable condition value responsive device (not shown). For example, a timing mechanism (not shown) could be arranged to hold the cam at a high spot as shown for fifty minutes, and at a low spot for ten minutes.

The recorder 16 may be of the conventional structures for producing a pneumatic signal as a function of a flow. A similar recorder is shown in Patent 2,631,570 issued to H. L. Bowditch on March 17, 1953. The recorder 16 is provided with a static pressure pen arm 24 as adjustable over a record chart 25 about a pivot 26, through adjustment means indicated as a mechanical connection 27. A second pen arm 28, also mounted on the pivot 26 for movement over the record chart 25, is responsive to the Figure I orifice plate unit (14) flow measurement differential pressure in the conventional manner through a mechanical connection 29.

The chart 25 is of the circular rotating variety, centrally mounted on a support hub 30, which is driven by a clock motor 31. The motor 31 has a balance wheel 32 and the clock mechanism is started and stopped in the operating action of this invention, by starting and stopping the oscillation of the balance wheel 32. The starting of a clock mechanism in this general manner requires a snap-like action, and such action is provided by this invention. Snapping action also is an aid in starting and stopping the gas flow and the record chart together. The balance wheel is stopped by snapping a resilient braking finger 33 against the periphery of the balance wheel, and it is started by snapping the braking finger along the balance wheel periphery in brushing relation therewith and then away from the balance wheel.

A snap lever system 34 is provided for thus controlling the clock mechanism, and is operated from the movement of a bellows 35, which is responsive to the pneumatic signals from the intermitter 12 by way of the pneumatic connection pipe 17. A mechanical operation connection 36 is provided between the bellows 35 and the snap lever system 34.

The snap lever system 34 is schematically illustrated in Figures II and III, and Figures IV, V, and VI show various views of an actual assembly of the snap lever system. Thus the system is essentially the same in all these views.

In the snap action lever system 34 as will be detailed hereinafter, the pneumatic signal from the intermitter is used to build up a spring bias to a point of release, at which time a lever is snapped against, or away from the balance wheel 32 as a means of stopping or starting the clock mechanism, according to the direction of the pneumatic signal.

The snap lever system 34 mainly comprises three pivoted lever units 37, 38, and 39 generally in the form of an X and preferably all pivoted on a single axis 40 at the central intersection of the X. However, for purposes of illustration the lever system in Figure II is shown with three slightly separated, parallel axes 40, 40', and 40", one for each of the levers. In any case, each lever is pivoted on an axis which is parallel to the oscillation axis 32' of the clock mechanism balance wheel 32.

The lever unit 37 extends transversely past its axis 40 to form one full leg of the X, while the other lever units 38 and 39 terminate at their axis points, each thus forming a half of the other leg of the X as in Figure II. In one form, the lever unit 39 extends to its axis point and then angles away therefrom to the balance wheel braking finger 33 as in Figures II and IV and V. The three lever units are movable about their pivots independently of each other except for particular connection arrangements therebetween. Lever units 37 and 38 are connected to each other near their outer ends by a coil spring 41. Thus these levers may be separated by movement about their respective pivots, against the biasing action of the spring 41. Also the lever units 37 and 38 are held apart by a fixed arm 42 which is located near the biasing spring 41 and which has one end secured to the lever unit 37 and the other end acting as an abutment, without connection to the lever unit 38, but against which the lever unit 38 is held by the biasing spring 41.

Thus with reference to Figure II, if the lever unit 38 is moved counterclockwise it will move the lever unit 37 along with it, unless the lever unit 37 is held back, in which case, the spring (41) bias builds up until whatever holds the lever 37 back is suddenly overcome, and then the lever unit snaps counterclockwise toward the lever 38. On the other hand any clockwise movement (Figure II) of lever unit 38 must be accompanied by clockwise movement of the lever unit 37, because of the fixed arm 42 therebetween. Lever units 37 and 39 have the same form of spring (41') and fixed arm (42') arrangement therebetween, on the opposite side of the pivots 40, etc.

The lever unit 39, by way of its extension 39', which is an angled piece in Figures II and IV–V and a straight extension in Figure III, is operatively associated with the clock mechanism balance wheel 32, Figures II and III. The resilient braking pin 33 is mounted on the outer end of the lever extension 39', in parallel with the axis 32' of the clock mechanism balance wheel 32. The outer end of the lever extension 39' is in a different plane than that of the balance wheel so that the braking pin 33 is the only part of the snap lever assembly to come into contact with the balance wheel.

A pair of stop members 43 are located on opposite sides of the lever extension 39' as limit stops therefore to keep the movement of the snap lever system within operative bounds. Between the stop members 43 and the outer end of the lever extension 39', a mid-point angled resilient cross-piece 44 is provided for retarding engagement with a snap action resilient pin 45 which is mounted on the lever extension 39' in parallel with the braking pin 33. The mid-point angle of the cross piece 44 is essentially in line with the balance wheel pivot 32' and the axis 40' or 40 as the case may be, of the lever unit 39. Thus, in Figure II the solid line showing shows the lever system 34 in braking relation with the clock mechanism 31, as held by the retarding action of the angle point of the crosspiece 44 with respect to the snap action pin 45. The Figure II dotted line showing of the lever extension 39' is indicative of the arrangement when the clock mechanism is released and operating. The pneumatic signal from the intermitter 12 builds up bias in either the spring 41 or the spring 41' against the retarding action of the crosspiece 44 with respect to the snap action pin 45, depending on whether the pneumatic signal is increased or decreased. When the signal is decreased, the inherent collapsing resiliency of the bellows 35 actuates the snap lever assembly 34.

The snap action system 34 is shown, in the solid line showing of Figures II and III, in the condition of holding the clock mechanism stopped. This condition is maintained, with the intermitter cam 18 held in the high spot position as shown, until it is time to inject more gas into the oil well.

When it is time to inject more gas, the intermitter cam 18 is rotated to a low spot engagement with the baffle 19, and the pneumatic signal output of the relay 23 is reduced. As a result, air is released from the operating motor of the valve 11, and the valve is opened. Essentially simultaneously the pneumatic pressure in the bellows 35 is reduced. This action moves the lever 38 clockwise, and the lever 37 is therefore also moved clockwise because of the rigid separator 42 between the levers 37 and 38. Beyond the lever pivot 40, the lever 37 thus also moves clockwise. A bias is built up in the spring 41' because the lever 39 is held against clockwise rotation by the snap action pin 45 as it bears on the midpoint angle of the resilient cross-piece 44. When the bias of the spring 41' is sufficiently strong, the snap action pin 45 is snapped past the midpoint angle of the cross piece 44. As a result, the lever extension 39' is moved clockwise, the braking pin 33 is wiped along and away from periphery of the balance wheel 32 to give it the necessary starting push, and the clock is started, with the braking pin 33 remaining away from the balance wheel 32, as shown in dotted lines in Figures II and III, until it is time to again stop the gas flow. The action of the lever system is then reversed, that is, an increased pressure in the bellows 35 builds a bias in the spring 41 by moving the lever 38 counterclockwise. The lever 37 through the rigid arm 42' is held against counterclockwise movement by the retarding action of the midpoint angle of the crosspiece 44 on the snap action pin 45 (in its dotted line position). When the bias in the spring 41 is sufficient to snap the pin 45 past the midpoint angle of the crosspiece 44, the braking pin 33 is again moved against the periphery of the balance wheel 32, and the clock mechanism is again stopped, with the lever system 34 again in the position shown in full lines in Figures II and III.

In Figures IV, V, and VI, the levers 39 and 39' are rigidly secured to the pivot shaft 40, and levers 37 and 38 are pivotally mounted on the shaft 40, with lever 37 made up of two levers rigidly secured together at the pivot area.

While the snap action system 34 is illustrated in Figures II, III and IV–VI with some structural differences, they are intended to be equivalent. The differences are for the purposes of illustration, and on this basis where possible, the same reference numbers are used throughout these views.

This invention, therefore, provides a new and improved device for the measurement of intermittent fluid flow.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in limiting sense.

We claim:

For use in an intermittently operated flow and recorder system wherein an intermitter concurrently operates a flow valve and the movement of a recording chart under a predetermined independent programming arrangement, a recording chart movement system comprising, in combination, a clock mechanism for producing said chart movement, and means for starting and stopping said clock mechanism, said means comprising a snap lever arrangement for stopping and starting the balance wheel of said clock mechanism, and a pneumatic arrangement for operating said snap lever arrangement in response to a predetermined pneumatic signal from said intermitter, said pneumatic arrangement comprising a bellows for receiving said predetermined signal and for producing a movement in response thereto, and said snap lever arrangement comprising a central pivot, an operating arm movable about said pivot in to and out of peripheral engagement with said balance wheel to stop and start said clock, a spring in the form of a wide, shallow V-mounted transversely of said operating arm, a pin mounted on said operating arm for sliding engagement with the central portion of the convex side of said V-spring, an intermediate arm movable about said pivot relative to said operating arm, a coil spring connection between said intermediate arm and said operating arm to oppose the pivotal separation of said operating and intermediate arms, a rigid bar secured to one of said operating and intermediate arms and arranged to engage the other of said operating and intermediate arms to oppose pivotal movement of said operating and intermediate arms toward each other beyond a minimum defined by the length of said rigid bar, an actuating arm movable about said pivot relative to said intermediate arm, coil spring and rigid bar connections between said actuating arm and said intermediate arm in like but opposite fashion with respect to said coil spring and rigid bar arrangement between said operating arm and said intermediate arm in relation to the overall pivotal movement of said snap lever arrangement, and means for transferring said bellows movement to said actuating arm whereby said pneumatic signal in one direction causes separation of said intermediate arm and said actuating arm against the bias of said coil spring therebetween until said bias is strong enough to move the whole of said snap lever arrangement by forcing said operating arm pin past the apex of said transverse spring.

References Cited in the file of this patent

UNITED STATES PATENTS

| | | |
|---|---|---|
| 1,681,174 | Diehl | Aug. 21, 1928 |
| 2,212,319 | Gerdts | Aug. 20, 1940 |
| 2,272,257 | Vogt et al. | Feb. 10, 1942 |
| 2,302,260 | Rothwell et al. | Nov. 17, 1942 |
| 2,631,570 | Bowditch | Mar. 17, 1953 |
| 2,638,110 | Parks | May 12, 1953 |
| 2,650,468 | De Negre | Sept. 1, 1953 |
| 2,714,547 | Francis | Aug. 2, 1955 |